Figure 1:
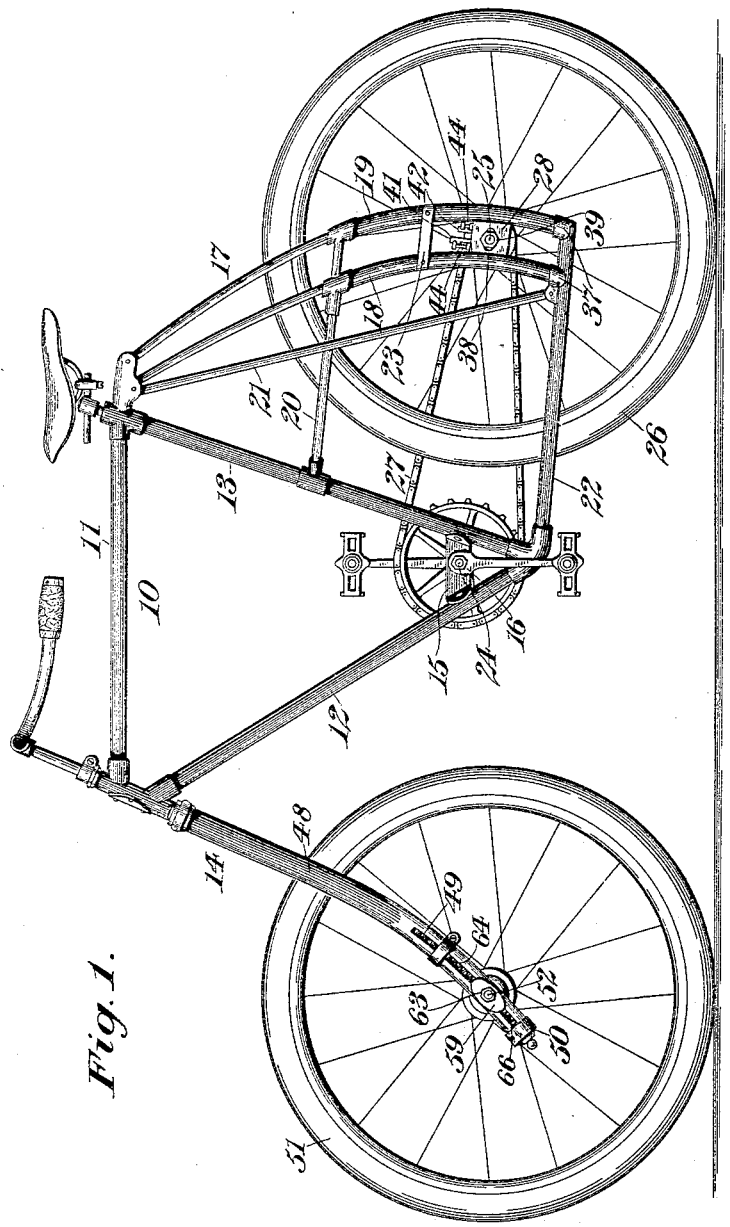

No. 638,723. Patented Dec. 12, 1899.
T. G. KELLY.
BICYCLE.
(Application filed Apr. 14, 1898.)

(No Model.) 2 Sheets—Sheet 1.

Witnesses
J. L. Edwards Jr.
H. J. Bernhard

Thomas G. Kelly Inventor
By his Attorneys,
C. A. Snow & Co.

THE NORRIS PETERS CO., PHOTO-LITHO., WASHINGTON, D. C.

No. 638,723. Patented Dec. 12, 1899.
T. G. KELLY.
BICYCLE.
(Application filed Apr. 14, 1898.)
(No Model.) 2 Sheets—Sheet 2.
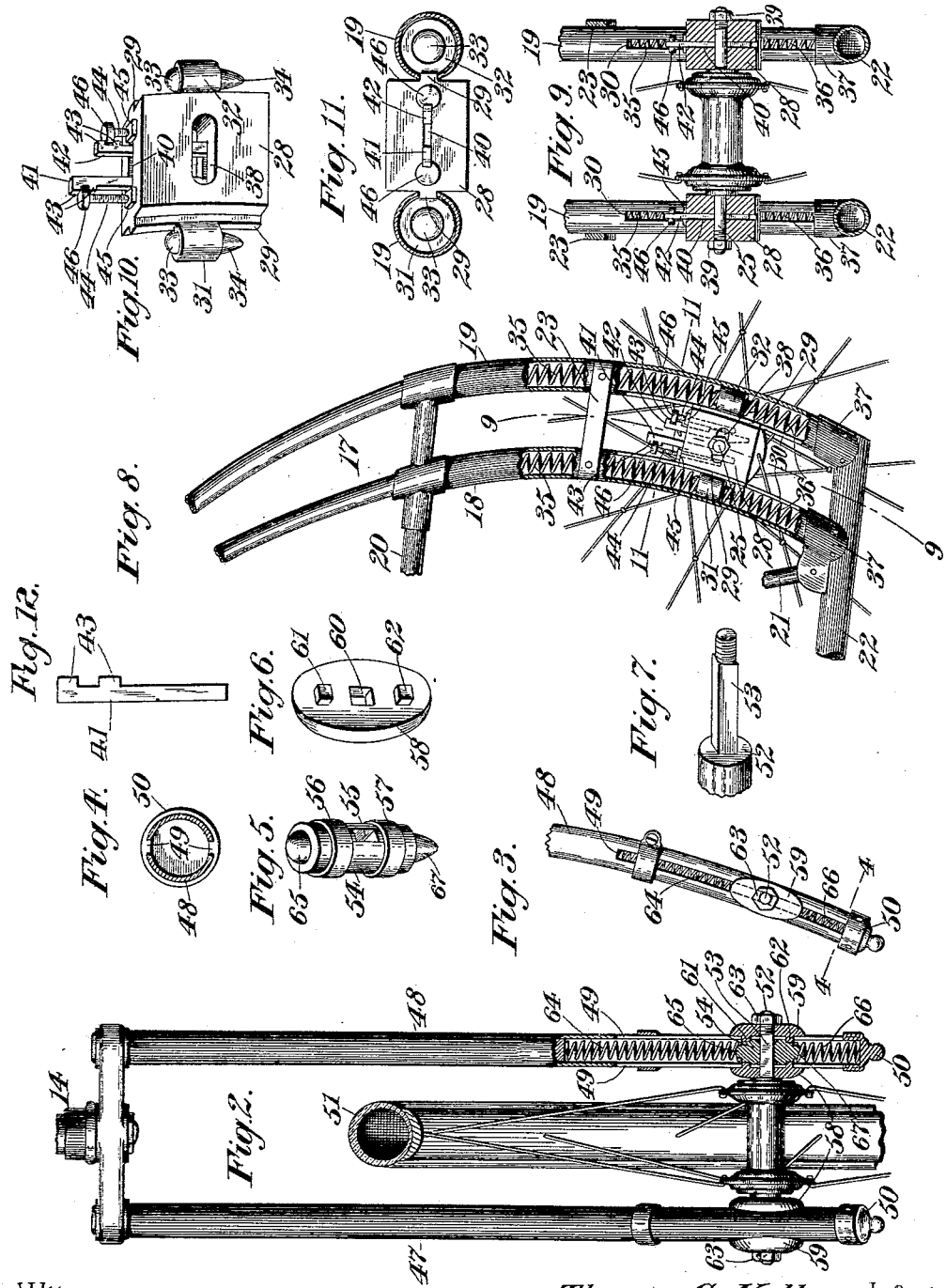
Witnesses
J. L. Edwards Jr.
H. J. Bernhard
Thomas G. Kelly Inventor
By his Attorneys,
C. A. Snow & Co.
THE NORRIS PETERS CO., PHOTO-LITHO., WASHINGTON, D. C.

UNITED STATES PATENT OFFICE.

THOMAS GETCHELL KELLY, OF BLISSVILLE, CANADA.

BICYCLE.

SPECIFICATION forming part of Letters Patent No. 638,723, dated December 12, 1899.

Application filed April 14, 1898. Serial No. 677,636. (No model.)

*To all whom it may concern:*

Be it known that I, THOMAS GETCHELL KELLY, a citizen of Canada, residing at Blissville, county of Sunbury, and Province of New Brunswick, Canada, have invented certain new and useful Improvements in Bicycles, of which the following is a specification.

My invention relates to improvements in bicycles of that class known as "spring-frame" safety-machines, in which the frame is yieldable under the weight of the rider when passing over rough roads or surfaces in order to reduce the jar and vibration and enable the rider to keep his feet on the pedals.

One object of the invention is to provide an improved construction in which cushion-springs are housed or confined within the frame to be protected in a substantial respect from accumulations of dust and dirt and the axles for the front and rear wheels are fitted to the frame to be confined against torsional strain, so as to permit the frame to slide easily and freely.

A further object of the invention is to provide a device for the rear part of the frame which will serve to cushion said frame without binding or cramping the parts or straining the chain and enable the rear-wheel axle to be adjusted without disturbing the relation of the coacting parts of the rear cushion device.

With these ends in view the invention consists in the novel combination of elements and in the construction and arrangement of parts, which will be hereinafter fully described and claimed.

To enable others to understand the invention, I have illustrated the same in the accompanying drawings, forming a part of this specification, and in which—

Figure 1 is a side elevation of a spring-frame bicycle constructed in accordance with the present invention. Fig. 2 is a sectional elevation of the front fork and a part of the front wheel, illustrating one of the cushion devices associated with the front axle. Fig. 3 is a detail view, in side elevation, of part of one member of the front fork. Fig. 4 is a detail cross-section through the fork member shown by Fig. 3 on the plane indicated by the dotted line 4 4 of said figure. Fig. 5 is a detail perspective view of one of the guide-blocks for the front axle. Fig. 6 is a detail perspective view of one of the clamping-washers adapted to be operatively connected with the front axle and the guide-block therefor. Fig. 7 is a perspective view of a fragmentary part of the front axle. Fig. 8 is a sectional elevation of part of the upright rear fork, illustrating the cushion device for one end of the rear axle. Fig. 9 is a transverse sectional view on the plane indicated by the dotted line 9 9 of Fig. 8. Fig. 10 is a detail perspective view of the slidable bearing for the rear axle. Fig. 11 is a horizontal sectional plan view on the plane indicated by the dotted line 11 11 of Fig. 8. Fig. 12 is a detail view of one key to show the forked head thereof.

Like numerals of reference denote like and corresponding parts in each of the several figures of the drawings.

The frame 10 in its general structure resembles the ordinary diamond safety-frame; but the upright rear fork of this frame is modified in its construction to slidably fit the rear cushion devices contemplated by the present invention and which will hereinafter be described in detail. This main frame has an upper reach-bar 11, a lower reach-bar 12, the inclined seat-post socket 13, which is joined to the reach-bars, and the steering-head 14, connecting the front ends of said reach-bars. This frame is provided with the short horizontal bearing-bar 15, which supports the bearing 16 of the crank-shaft. The upright rear fork 17 has two pairs of arc-shaped members 18 19, and one pair of these members is disposed on one side of the rear wheel, while the other pair of said members lies on the opposite side of the rear wheel in positions coincident with the first-named pair of members, whereby the rear wheel may be fitted between the two pairs of fork members, and the slidable bearings for the rear axle are confined between the pairs of arc-shaped members to travel freely therein. Each pair of members 18 19 of the rear fork are braced to the seat-post socket 13 by the horizontal strut 20, and an upright strut 21 lies in advance of the rear fork, so as to join the upper end of the post-socket 13 with the rear end of the horizontal lower fork 22, the front end of the latter being united at the junction of the post-socket 13 and the lower reach-bar 12. A stop-plate 23 spans the space between the members 18 19 of the rear fork, and this stop-plate is securely fastened in any approved way to said members for the purpose of limiting the downward movement of the rear fork on the bearing of the rear axle. The pedal-shaft 24 is properly journaled in the bearing 16, and, as is usual, this shaft has the pedal-cranks and the sprocket-gear. The rear axle 25 supports the wheel 26 in the usual way, and the hub of this wheel and the pedal-shaft are connected operatively by any approved type of gearing, which is indicated by the numeral 27. The rear axle 25 is supported in a pair of slidable bearings 28, and these two bearings occupy the spaces between the pairs of members 18 19 of the rear fork. Said members 18 19 of the rear fork are arc-shaped and are arranged concentric with the axis of the pedal-shaft, and the bearings 28 are slidably fitted to said arc-shaped members for the frame to yield or travel in an arc of a circle, so that the frame will not bind on the bearings nor strain the driving-gearing between the rear-wheel hub and the pedal-shaft. Each bearing 28 is provided on its opposite sides with guide-ribs 29, which are loosely fitted in longitudinal slots 30, produced in the opposing faces of the arc-shaped members 18 19 of the upright rear fork. The bearing is, furthermore, provided with the guide-posts 31 32, which are joined to the guide-ribs 21 and are substantially circular in cross-section for the purpose of fitting snugly in the tubular arc-shaped members 18 19 of the rear fork. The guide-posts 31 32 are provided at their upper ends with the centering-studs 33, and at their lower ends they have centering-studs 34, which exceed the length of the studs 33. Cushion-springs 35 are housed or contained within the tubular members 18 19 of the rear fork, and these springs are seated on the guide-posts 31 32, so as to surround the studs 33 on said posts, whereby the springs are prevented by the studs from becoming displaced on the posts of the axle-bearing 28. The upper springs 35 are properly fitted to the fork members 18 19, and they cushion the downward movement or vibration of the frame. The lower springs 36 are fitted in the fork members 18 19 below the bearing 28, and said springs are arranged for their upper ends to surround the centering-studs 34 and to bear against the lower ends of the guide-posts 32. These lower springs cushion the upward movement of the frame when impelled by the upper springs 35, which are much longer and stronger than the lower springs, and said lower springs 36 are seated on the foot-pieces 37, which are secured to the fork members 18 19 in any approved way, and are also attached to the horizontal rear fork 22, substantially as shown by Fig. 8, for the purpose of joining the upright rear fork 17 and the lower horizontal fork 22.

The bearings 28 in the two pairs of members forming the rear fork are provided with horizontal slots 38 for the reception of the ends of the rear axle 25, and said axle is adjustable in a horizontal plane in the slotted bearings for movement toward or from the pedal-shaft, so as to enable the slack in the driving-chain to be taken up. The threaded ends of the axle pass through the slots in the bearings, and said axle is held firmly in place by the nuts 39, which are screwed on the threaded axle ends and bind against the slotted bearings.

To secure nicety of adjustment of the axle in the slotted bearings and to maintain the axle firmly in its adjusted position, I provide adjusting devices on each bearing 28. A vertical slot or slots 40 is produced in each bearing 28 to intersect with the horizontal slot 38 therein, and in this vertical slot or slots are fitted the keys 41 42, which are disposed on opposite sides of the axle 25 and in engagement therewith. Each key protrudes above the slotted bearing-block 48, as shown by Fig. 10, and this protruding end of the key has a pair of lugs 43, adapted to receive the head of the adjusting-screw 44. This screw is fitted in a threaded nut or bearing 45, which is fast with or formed in the slotted bearing, and the head 46 of the screw is engaged with the lugs 43 in order that the screw may assist in holding the key in place. By reference to Figs. 10 and 11 it will be noted that the heads 46 of the screws are larger in diameter than the width of the keys, and the screw-heads are thus disposed in relation to the forked heads of the keys to permit ready access to be obtained to the screw-heads for the purpose of rotating the screws in their fixed bearing-nuts 45 to raise or lower the keys. The screws are loosely connected with the forked heads of the keys for the purpose of adjusting the latter in relation to the axle, which is fitted in the slot 38 of the bearing-block, and said keys may be adjusted separately by the screws to make the keys hold the axle firmly in place. It will be understood that each key is connected in the manner described with a screw and that the screws are adjustable independently for the purpose of raising or lowering the keys in order to properly engage with the axle when it is adjusted.

Previous to adjusting the axle in the horizontal slots of the bearings the nuts 39 should be released, and then the screws for the rear keys 42 should be operated to raise the keys. The screws for the front keys 41 may now be adjusted to force the axle in a rearward direction within the slots 38 of the bearings 28, the rear keys lowered into firm engagement with the axle, and, finally, the nuts 39 are tightened on the ends of the axle, thereby firmly clamping the axle in its adjusted position.

It will be observed that the bearings and the springs cushion the rear part of the frame when the bicycle strikes an obstruction or travels over a rough surface, that the frame may vibrate in a vertical plane without cramping on the bearings 28 or straining the driving-chain, and that the rear axle may be adjusted readily in the slotted bearings without disturbing the relation of the coacting elements forming the cushion for the rear part of the bicycle-frame.

The front fork of the bicycle has its members 47 48 joined to the crown in the ordinary way, and this fork has a spindle, which is mounted in the steering-head of the frame. Said members of the front fork have longitudinal slots 49 formed therein to extend entirely through said members, and the lower open ends of the tubular slotted fork members are provided with foot-pieces 50, which are firmly secured thereto, for the purpose of seating the lower cushion-springs of the front axle and of imparting an ornamental finish to the front fork. The front wheel 51 is mounted in the ordinary way on the front axle 52, which is provided with the angular stems 53, that project through the slots in the fork members. Cylindrical guide-blocks 54 are fitted loosely in the tubular front-fork members, and these guide-blocks have the angular openings 55 produced therein between the annular spaced collars 56 57. The collars engage with the inner faces of the tubular fork members, and the guide-blocks receive the angular stems 53 of the axle, whereby the axle is mounted in the guide-blocks to be held against rotation thereby and the front fork is free to slide or move on the guide-blocks, which are held stationary by the front axle. A pair of washers 58 59 are fitted on each angular stem 53 of the axle, and these washers have square apertures 60, the opposing faces of said washers being, furthermore, provided with the lugs 61 62. The washers 58 59 are threaded on the angular stem at one end of the axle to bear or impinge against opposite faces of one member of the front fork, and the lugs 61 62 of said washers pass through the slot 49 in the fork member, so as to engage with or rest upon the collars 56 57 of the guide-block 54. One washer, 58, is fitted on the axle-stem to engage with one end of the wheel-hub and to bear against the inner face of one fork member, while the other washer, 59, bears against the outer face of the fork member and is clamped in place by the axle-nut 63. The upper cushion-spring 64 has its upper extremity bearing on the fork member, while its lower end encircles a stud 65 on the upper end of the guide-block 54, whereby the respective ends of the upper spring are seated against the fork member and one guide-block on the axle. The lower spring 66 has its upper extremity fitted to the stud 67 on the lower end of the guide-block 54, and this lower spring is seated on one of the foot-pieces 50. The front axle is thus firmly held on the front fork, and this fork is free to travel against the tension of the cushion-springs in a vertical direction. The axle, the guide-block, and the washers provide a strong and substantial guide for the front fork, and the parts may readily and quickly be assembled.

Having thus described the invention, what I claim is—

1. In a spring-frame bicycle, the combination with a front fork having the hollow slotted members provided with foot-pieces, of blocks fitted in said fork members, a two-part clamp fitted to each fork member on opposite faces thereof and having interlocking engagement with one of said blocks, an axle passing through the blocks and the clamps and provided with nuts arranged to bind against the outer members of said clamps, and cushion-springs fitted in the fork members above and below the blocks to engage with the respective ends thereof, substantially as described.

2. In a spring-frame bicycle, the combination with a front fork having the slotted, tubular members provided with the foot-pieces, and an axle having angular ends which pass through the slotted fork members, of the cylindrical guide-blocks provided with annular ribs and angular openings to receive the angular ends of the axle, a pair of washers fitted on each angular end of the axle, against opposite sides of the fork member, and having lugs which engage with the ribs of the guide-block, the axle-nut bearing against the outer washers, and cushion-springs fitted to the respective ends of the guide-block and seated against the fork member and its foot-piece, substantially as described.

3. In a spring-frame bicycle, a rear fork having the arc-shaped slotted members, a bearing-block arranged in the space between said fork members, guides slidably fitted in the slotted members of said fork and connected to said bearing-block, and cushion-springs housed within the fork members and engaging with the guides of said bearing, in combination with a rear axle clamped in the bearing-block, substantially as described.

4. In a spring-frame bicycle, a rear fork having the arc-shaped, hollow members provided in their opposing faces with slots and at their lower ends with the foot-pieces, a bearing interposed between said arc-shaped members and provided with the guide-ribs and with the guide-posts which are housed in the hollow forked members, and the cushion-springs contained within the forked members and seated against the guide-posts of the bearing-block, in combination with an axle mounted in the bearing-block between the members of the fork, substantially as described.

5. In a spring-frame bicycle, the combination of a rear fork provided with the hollow members, a bearing-block slidably connected to the members of the rear fork and provided with a transverse slot and with a vertical slot which intersects with said transverse slot, cushion-springs within the fork members and fitted actively to the bearing, a rear axle supported in the transverse slot of the bearing, the adjustable keys in the vertical slot of the rear axle, and adjusting-screws mounted in the bearing and operatively connected with the keys, substantially as described.

THOMAS GETCHELL KELLY.

Witnesses:
JOE. L. CHRISTIE,
A. G. BECKWITH.